3,781,362
REMOVAL OF 1,2-DIAMINOCYCLOHEXANE IMPURITY FROM CRUDE HEXAMETHYLENEDIAMINE

Robert Clifford Blackstone, Orange, Tex., assignor to E. I. du Pont de Nemours and Company, Wilmington, Del.
No Drawing. Filed Aug. 7, 1972, Ser. No. 278,461
Int. Cl. C07c 87/14
U.S. Cl. 260—583 N    6 Claims

ABSTRACT OF THE DISCLOSURE

A process for removing 1,2-diaminocyclohexane impurity from crude hexamethylenediamine by contacting the crude hexamethylenediamine with a carbohydrate having from 3 to 12 carbon atoms and an acid catalyst to produce a reaction product of low volatility and thereafter distilling the hexamethylenediamine of reduced impurity level from the reaction product.

BACKGROUND OF THE INVENTION

In the refining of hexamethylenediamine produced by hydrogenation of adiponitrile difficulty is experienced in removing some of the accompanying by-products, especially 1,2-diaminocyclohexane because of the proximity of its boiling point to that of hexamethylenediamine. Rigid specification levels on 1,2-diaminocyclohexane are necessary because of its tendency to induce color formation in stored hexamethylenediamine as well as in polyamides made from the hexamethylenediamine.

STATEMENT OF THE INVENTION

It has now been found that 1,2-diaminocyclohexane impurity can be removed from crude hexamethylenediamine by contacting the hexamethylenediamine with a carbohydrate and an acid catalyst to form a reaction product of low volatility. Distillation of the reaction mixture yields hexamethylenediamine of reduced impurity level.

The carbohydrate can be any monosaccharide or disaccharide having from 3 to 12 carbon atoms or mixtures thereof. Typical carbohydrates include monosaccharides such as glyceraldehyde, glycerose, erythrose, xylose, ribose, lyxose, glucose, fructose, galactose and sorbose, and disaccharides such as sucrose, maltose, lactose, cellobiose, raffinose and melibiose. Among the monosaccharides, glucose, fructose and sorbose are most readily available and are preferred. A convenient source of glucose for this purpose is corn sugar. Among disaccharides, sucrose, maltose and lactose are most readily available and thus preferred. A convenient source of sucrose for this purpose is industrial molasses.

The amount of carbohydrate used will depend on the amount of 1,2-diaminocyclohexane impurity that is present and the impurity level to be attained in the refined hexamethylenediamine. In general at least a molar equivalent amount of the carbohydrate based on 1,2-diaminocyclohexane is employed. An excess of carbohydrate can be used; however, for economic reasons the excess would not normally be greater than tenfold.

The reaction can be carried out at a temperature in the range of about 25 to 175° C. The acid catalyst can be mineral acid such as sulfuric, hydrochloric or phosphoric or an organic carboxylic acid such as acetic, propionic, oleic, maleic or citric acid as well as boric acid or an acidic ion exchange resin.

The reaction can be carried out in any suitable reaction vessel under subatmospheric, atmospheric, or superatmospheric pressure, and preferably at atmospheric pressure under an inert atmosphere such as nitrogen. The process can be carried out batchwise or continuously.

In the practice of the invention the crude hexamethylenediamine is contacted with an aqueous solution containing the carbohydrate and appropriate acid catalyst. Alternately the carbohydrate and acid catalyst can be introduced directly into the crude diamine. The reaction mixture is then heated, usually with agitation, for a period of time sufficient to effect reaction between the carbohydrate and the 1,2-diaminocyclohexane. Usually the treatment is carried out for at least one hour and conveniently under reflux conditions. In general, extension of treatment time leads to further reduction in impurity level. Volatile materials are removed during the treatment or just prior to recovery of the desired refined hexamethylenediamine by distillation.

The refined hexamethylenediamine provided by the process of this invention is especially suitable as an intermediate in the synthesis of the widely used polyamides.

DESCRIPTION OF THE PREFERRED EMBODIMENTS

The process of this invention is more fully illustrated in the examples to follow. Unless otherwise specified, all parts are by weight.

EXAMPLE 1

To 300 g. crude hexamethylenediamine (HMD) containing 3300 p.p.m. 1,2-diaminocyclohexane (DCH) was added a solution of 5 g. sucrose (cane sugar) and 10 drops concentrated sulfuric acid in 25 ml. water which had been stirred overnight (invert sugar). The treated HMD was stirred overnight at 60° with a nitrogen blanket. The mixture was then distilled under partial vacuum to remove water and volatile bases, then refluxed one hour at 160°. About 230 ml. HMD was then distilled over. Gas chromatographic analysis determined the DCH content to be .06% (600 p.p.m.).

EXAMPLE 2

To 300 g. HMD containing 3300 p.p.m. DCH was added 5 g. of fructose and 10 drops concentrated hydrochloric acid dissolved in 20 ml. water. The treated HMD was stirred for 70 hours at 60°. At the end of this time water and volatile materials were removed under reduced pressure and the mixture was refluxed for one hour at 160°. Distillation gave refined HMD in which DCH could not be detected by gas chromatography.

EXAMPLE 3

To 900 g. crude (97%) HMD containing 3200 p.p.m. DCH was added a sucrose solution comprising 20 g. industrial molasses and 1 g. concentrated sulfuric acid dissolved in 60 ml. water. The mixture was divided into three equal portions. The first portion was refluxed for one hour at 160° and then distilled to give refined HMD containing 1100 p.p.m. DCH. The second portion was stirred 20 hours at 80°, then it was refluxed and distilled as described above to give refined HMD containing 800 p.p.m. DCH. The third portion was stirred for 110 hours at 80°, then it was refluxed and distilled as described above to give refined HMD which contained only 4 p.p.m. DCH by colorimetric analysis. Gas chromatography analysis was unable to detect DCH.

EXAMPLE 4

To 100 lbs. crude (80%) HMD containing 2700 p.p.m. DCH was added a glucose solution comprising 900 g. of corn sugar (Corn Products Co.–Enzose®) and 50 ml. glacial acetic acid in 2000 ml. water. The mixture was stirred and heated to 90° and aliquots were withdrawn for analysis at various times. A sample withdrawn immediately was refluxed and distilled as described above to give HMD containing 700 p.p.m. DCH. After 24 hours at 90°, a sample was withdrawn, refluxed and distilled to give HMD containing 400 p.p.m. DCH. After 96 hours at 90°, a sample so treated showed less than 100 p.p.m. DCH and after 120 hours the HMD contained only 4 p.p.m. DCH. The remainder of the 100-lb. sample was then distilled in a continuous feed semiworks scale still to give about 70 lbs. of high quality anhydrous refined HMD.

EXAMPLE 5

To 900 g. crude (97%) HMD containing 3200 p.p.m. DCH was added 20 g. industrial molasses and 10 g. Dowex® 50W–X8 acidic ion exchange resin (Dow Chemical Co.). The mixture was stirred at 80° with sufficient vigor to keep the resin particles suspended. At the end of 45 hours a 300 ml. aliquot was withdrawn, the resin was filtered out, and the HMD was refluxed and distilled as described above. The distilled HMD contained only 700 p.p.m. DCH.

EXAMPLE 6

To 300 g. crude (97%) HMD containing 3200 p.p.m. DCH was added 7 g. molasses and 0.5 g. citric acid dissolved in 20 g. water. The mixture was stirred at 80° for one hour and then refluxed one hour at 160° and distilled. The distilling HMD contained 1100 p.p.m. DCH. Similar results were obtained treating HMD with fructose and oleic acid.

EXAMPLE 7

To 300 g. crude HMD containing 3300 p.p.m. DCH was added 5 g. fructose and 10 days of phosphoric acid in 20 ml. water. The mixture was dehydrated and then refluxed as described above during which time a phosphate salt precipitated. Distillation gave refined HMD containing 2100 p.p.m. DCH.

EXAMPLE 8

To 300 g. crude HMD containing 3300 p.p.m. DCH was added 6 g. of corn sugar (Corn Products Co.—Enzose®) and 0.25 g. of boric acid dissolved in 20 ml. water. The mixture was stirred overnight at 70° and then refluxed at 160° for one hour. Distillation gave refined HMD containing 1000 p.p.m. DCH.

I claim:

1. A process for removing 1,2-diaminocyclohexane impurity from crude hexamethylenediamine which comprises contacting in a reaction vessel the crude diamine with a carbohydrate having from 3 to 12 carbon atoms and of the group consisting of monosaccharides, disaccharides and mixtures thereof, and an acid catalyst of the group consisting of mineral acids, organic carboxylic acids, boric acid and acidic ion exchange resins, at a temperature in the range of about 25 to 175° C. for a time sufficient to form a reaction product between the carbohydrate and the 1,2-diaminocyclohexane impurity and thereafter distilling hexamethylene of reduced impurity content from the reaction vessel.

2. The process of claim 1 wherein the carbohydrate is sucrose.

3. The process of claim 2 wherein the sucrose is in the form of molasses.

4. The process of claim 1 wherein the carbohydrate is fructose.

5. The process of claim 1 wherein the carbohydrate is glucose.

6. The process of claim 5 wherein the glucose is in the form of corn sugar.

References Cited
UNITED STATES PATENTS
2,957,917  10/1960  Garmaise et al. ___ 260—583 N LEWIS GOTTS, Primary Examiner D. R. PHILLIPS, Assistant Examiner U.S. Cl. X.R.
260—563 C, 563 P, 583 K